United States Patent [19]

Baumann

[11] 4,371,355
[45] Feb. 1, 1983

[54] FLEXIBLE AND BACKLASH FREE ROTARY STEM COUPLING

[76] Inventor: Hans D. Baumann, P.O. Box 471, Rye, N.H. 03870

[21] Appl. No.: 211,046

[22] Filed: Nov. 28, 1980

[51] Int. Cl.³ ............................................. F16D 3/52
[52] U.S. Cl. .................................. 464/101; 403/289; 403/302; 403/309; 403/405
[58] Field of Search ............ 64/11 R, 11 F, 12, 15 R, 64/15 B, 27 B, 27 C; 403/289–291, 300, 302, 303, 309–313, 405, 223; 464/77, 98, 100, 101

[56] References Cited

U.S. PATENT DOCUMENTS

| | | | |
|---|---|---|---|
| 2,100,232 | 11/1937 | Barry | 64/15 B |
| 2,105,178 | 1/1938 | Berndt | 403/302 |
| 2,246,750 | 6/1941 | Murphy | 64/15 B |
| 2,591,769 | 4/1952 | Beechler | 64/15 B |
| 2,724,251 | 11/1955 | Weaver | 64/15 B |
| 2,968,169 | 1/1961 | Davis | 64/15 B |
| 2,971,355 | 2/1961 | Walsh | 64/15 B |

Primary Examiner—John Petrakes

[57] ABSTRACT

A flexible and backlash free coupling to connect adjustably between two separate rotary shafts for the purpose of transmitting rotary power and torque, whereby said coupling is able to slip on loosely over either of two separate stem configurations and whereby one end of said coupling will conform elastically to the one stem configuration while, in a second mode of elastic or plastic deformation, the opposite portion of the coupling attaches tightly to a second stem configuration within a certain range of dimensional width.

2 Claims, 4 Drawing Figures

U.S. Patent  Feb. 1, 1983  4,371,355
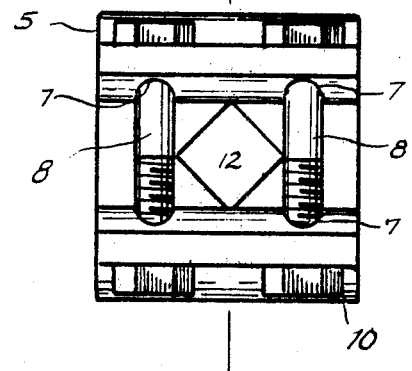
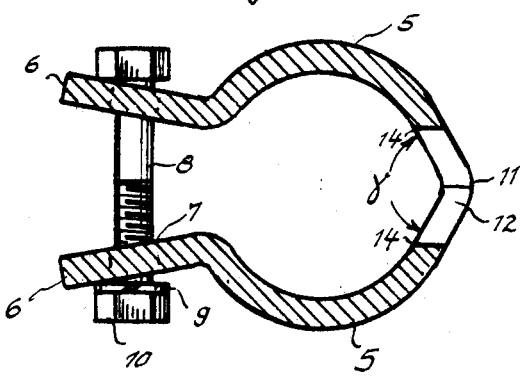
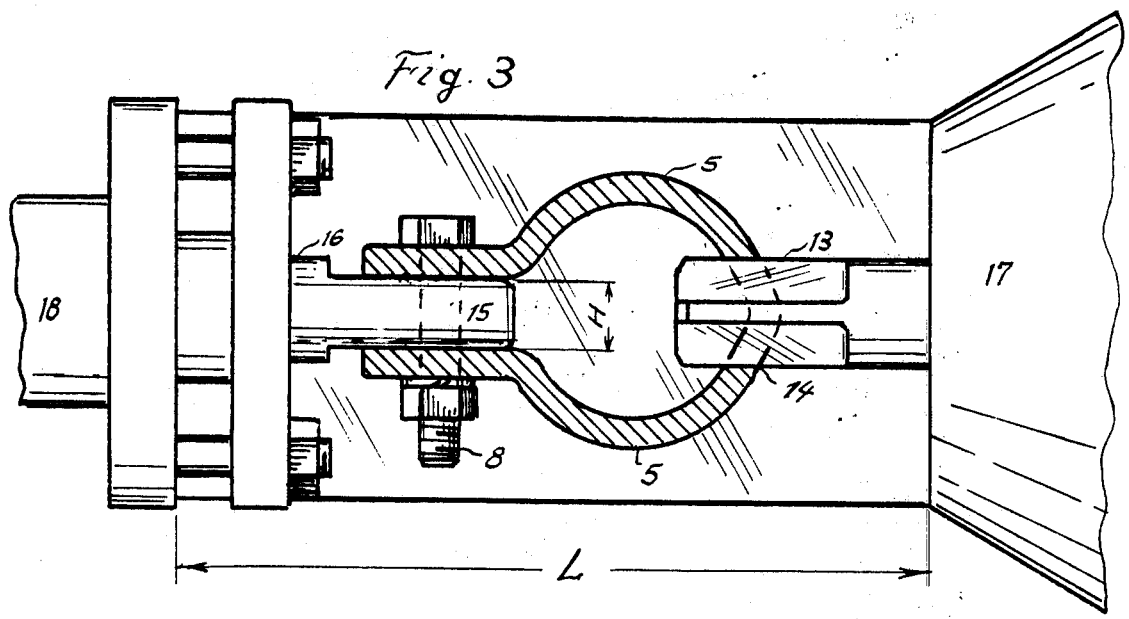
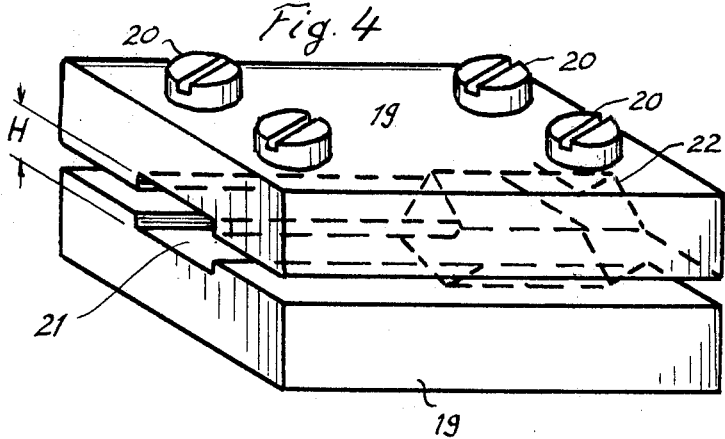

FLEXIBLE AND BACKLASH FREE ROTARY STEM COUPLING

BACKGROUND OF THE INVENTION

This invention relates to means of coupling a rotating output shaft of a motor or actuating device to a rotating valve stem used in butterfly valves, ball valves, plug valves, or other rotary devices.

Couplings heretofore used for this purpose are milled or precision formed out of solid metal to conform within very close tolerances to a given set of motor shaft dimensions on one end and a specific shaft dimension on the other (valve) end. Such a procedure is very expensive and inflexible, since there exists a wide disparity between shaft dimensions of various valve sizes. A given actuator size might be used for butterfly valve sizes 2", 3" and 4". Each of these different butterfly valves, as a rule, has a different shaft dimension and would, therefore, require three separate solid couplings. If the same actuator were to be used also for a variety of ball valves or other valve types, then the required number of couplings will increase in proportion with the accompanying loss of flexibility and the need for stocking a great variety of coupling parts for each actuator.

My invention overcomes these disadvantages by providing for the use of only one single coupling configuration per actuator size. My invented coupling has the capability of adjusting either in elastic or in the plastic deformation range to a great variety of valve shaft dimensions.

A further object of my invention is to provide for a coupling that is inexpensive and which can be made by a simple stamping process without the need for costly machining operations.

Yet, a third object of my invention is the provision of a coupling that easily tolerates a misalignment between the two separate shaft ends without impairing the load carrying torque transmitting capabilities.

In view of these and other advantages, my invention can be more plainly understood in view of the accompanying drawings.

BRIEF DESCRIPTION OF THE DRAWINGS

FIG. 1 is a vertical end view of my invention in the relaxed condition.

FIG. 2 is a vertical, central cross sectional view of FIG. 1 taken along the lines 2—2.

FIG. 3 shows the configuration of FIG. 2 in the installed mode between a pair of shafts as part of a valve actuator system.

FIG. 4 is a present state of the art coupling device in an isometric view.

DESCRIPTION OF THE INVENTION

My invention consists of a strip of metal 5 formed in a semi-circular configuration with each end terminating in a flattened flange-like portion 6. Each of these flanges has two bores 7 through which a pair of bolts 8 is placed. These bolts 8 are capable of compressing the two flange-like portions 6 towards each other with the aid of a pair of washers 9 and hex nuts 10. The wall portion of steel strip 5 located opposite bolts 8 is slightly wedge shaped at 11 and is pierced in a square configuration 12 to receive an actuator shaft 13 as shown in FIG. 3. Pierced opening 12 has a slight clearance when the coupling is relaxed as seen in FIG. 2 compared to the dimensions of actuator shaft 13. However, upon tightening of bolts 8, the upper or lower most portion 14 of opening 12 will move towards the center of steel strip 5 and will start to deflect around a wedge-shaped area 11. The movements of surfaces 14 are limited by the clearance towards actuator shaft 13 and will terminate once there is metal to metal contact. A further tightening of bolts 8 will then produce additional deformation within the curved portion of steel strip 5 lying between contact points 14 and the flanged portions 6. This additional deformation will terminate once the heighth H of a flattened portion 15 of a rotary valve shaft 16 is reached and tight contact is achieved. By shaping the central portion 11 of metal strip 5 in a wedge-shaped configuration, a greater displacement of points 14 is allowed for any given change in angle $\gamma$. The displacement 14 is equal to $(\sin \gamma_1/2)-(\sin \gamma_2/2)$. A small angle $\gamma$ will produce more motion of points 14. The preferred angle of $\gamma=120°$.

My invention is designed to accommodate a great diversity of shaft widths H within the range of possible deformation. For example, a typical embodiment of my invention would interface between a $\frac{5}{8}$ actuator shaft and valve shafts having flattened shaft portions H between 0.56" to 0.10".

While the illustrated embodiment shows a square opening for actuator shaft 13, it should be understood, that this is for sake of illustration only. Pierced opening 12 could also be hexagonal, oblong or of any other common shape without distracting from the scope of my invention.

It should be clear from the above description that my flexible coupling will operate generally in a two stage manner: first, a deflection around the extreme wedge shaped portion 11 to wrap tightly around an actuator shaft 13 and thereby eliminate all backlash or lost motion. Secondly, there is additional deformation to accommodate a variety of flat, square, hexagonal or any other valve shaft configuration having two flat parallel and opposing surfaces. Again, securely tightening the two flanged portions 6 against the flattened shaft portion 15 will eliminate backlash and lost motion at this point.

A further advantage of my invention is that when the tension of bolts 8 is released, both flanged portions 6 will immediately open up due to the spring action of the metal strip 5 which makes the disassembly of a valve from the actuator device very easy even after years of prolonged service.

Due to the flexible nature of my coupling invention, there is compensation for misalignment between the center of the actuator stem 13 and valve shaft 16. Such misalignment can be accommodated by an unequal deformation between the upper and lower flanged portion 6 without impairing the torque transmitting capabilities of the device. Since both flanged portions 6 and pierced opening 12 can slide freely on either shaft whenever bolt tension 8 is relaxed, my coupling invention will adapt to a great variety of distances L between an actuator 17 and a valve 18.

FIG. 4 shows a conventional solid coupling consisting of two plates 19 bolted together with suitable fasteners 20. Each of plates 19 have to be milled on one side with a grooved part 22 closely adapting to the configuration of actuator stem 13, while the other side has to be milled with a different groove 21 capable of adapting closely to valve stem 15. The machining of configuration 21 and 22 has to be very accurate in order to maintain a parallel contact between the engaging respective stems. It is further obvious, that the device shown in FIG. 4 will tolerate no degree of misalignment nor any great variation in distance L.

While my invention has been shown in a preferred configuration with a solid semi-circular metal strip and one pair of fasteners, this should not be construed as a limitation of my claims. For example, it would be obvious to use two pair of fasteners instead of one or to provide additional perforated openings in the flexible portion of my coupling to aid in the bending action. For the same reason, there could be a variation in width of my metal strip 5 along the circular portion.

Having thus clearly shown and described the invention, what is claimed as new and desired to secure by Letter Patent is:

1. Flexible and backlash free rotary stem coupling consisting of a semi-circular metal strip having flattened flange-like terminating ends, each of these flange-like terminating ends having openings that accomodate fasteners suitable to force each of the flange-like portions towards each other and thereby causing a clamping action against flattened stems, the portion of the semi-circular metal strip lying opposite and between said flange-like configurations has a pierced opening, said flange-like portions being separated by a wedge-like gap when the fastening devices are disengaged and being capable of assuming a parallel separation from each other upon tightening of said fasteners and following a deformation of the semi-circular metal strip, and wherein such deformation of the semi-circular metal strip is capable of simultaneously reducing the size of the pierced opening to cause gripping action around shafts or rotating stems.

2. Flexible and backlash free rotary stem coupling of claim 1, wherein said pierced opening is part of a portion of the metal strip and has a wedge-like configuration that is blended into the semi-circular shaped portion of the metal strip and wherein the included wedge angle is less than 120°.

* * * * *